United States Patent
Lee et al.

(10) Patent No.: US 7,952,858 B2
(45) Date of Patent: May 31, 2011

(54) MULTI-STAGED HINGE ASSEMBLY AND PORTABLE ELECTRICAL DEVICE COMPRISING THE SAME

(75) Inventors: Ying-Xing Lee, Taoyuan (TW); I-Cheng Chuang, Taoyuan (TW); Ying-Yen Cheng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 70 days.

(21) Appl. No.: 12/486,363

(22) Filed: Jun. 17, 2009

(65) Prior Publication Data
US 2010/0118475 A1    May 13, 2010

(30) Foreign Application Priority Data

Nov. 7, 2008  (TW) .............................. 97143183 A

(51) Int. Cl.
*G06F 1/16* (2006.01)
(52) U.S. Cl. ..................... 361/679.01; 16/330; 200/401; 292/699.22; 254/274
(58) Field of Classification Search ............... 16/303, 16/297, 277, 290, 367, 330; 361/679.01, 361/679.09, 679.21, 679.27, 679.28; 200/400, 200/401, 18; 301/132, 124.1; 292/169.17, 292/699.22, 363.3; 188/72.8, 72.7; 254/270, 254/274, 10.5
See application file for complete search history.

(56) References Cited

U.S. PATENT DOCUMENTS

| | | | | |
|---|---|---|---|---|
| 6,148,480 | A * | 11/2000 | Cooke | 16/303 |
| 2003/0231935 | A1 * | 12/2003 | Schuon | 409/33 |
| 2004/0177477 | A1 | 9/2004 | Hsieh | |
| 2006/0112517 | A1 | 6/2006 | Luo et al. | |
| 2010/0218343 | A1 * | 9/2010 | Cheng et al. | 16/297 |

FOREIGN PATENT DOCUMENTS

KR    2004 0035064    4/2004

OTHER PUBLICATIONS

European Search Report from corresponding EPO Application No. 09163724.9 dated Mar. 31, 2010.

* cited by examiner

*Primary Examiner* — Hung V Duong
(74) *Attorney, Agent, or Firm* — Grossman, Ticker, Perreault & Pfleger, PLLC

(57) ABSTRACT

A multi-staged hinge assembly and a portable electrical device comprising the multi-staged hinge assembly are provided. The multi-staged hinge assembly utilizes a non-circular spindle to associate with a plurality of movable elements disposed thereon. One of the body portions of the portable electrical device automatically tilts at an angle after the body portion slides by the multi-staged hinge assembly. The user could further adjust the angle to meet the demands of various situations.

26 Claims, 8 Drawing Sheets

MULTI-STAGED HINGE ASSEMBLY AND PORTABLE ELECTRICAL DEVICE COMPRISING THE SAME

This application claims the benefits of the priority based on Taiwan Patent Application No. 097143183 filed on Nov. 7, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a multi-staged hinge assembly for a portable electrical device that is capable of driving a portable electrical device to automatically tilt after sliding.

2. Descriptions of the Related Art

According to the advancement of the manufacturing processes and mobile communication technologies, portable electrical devices are becoming increasingly popular and also gradually miniaturized in size. With different designed structures, the portable electrical devices can provide more diversified operational styles to satisfy the various needs of users.

For example, to allow users to browse information displayed on the screens of the portable electrical devices more clearly and input relatively complex instructions, the portable electrical devices now tend to be designed with both a larger and wider display and a keyboard comprising multiple keys. Because these components occupy a large volume, common portable electrical devices currently available are mostly of a clamshell or slide design for convenient use.

The operation for a portable electrical device 1 of a slide design is shown in FIGS. 1A and 1B. The portable electrical device 1 comprises a first body portion 11 and a second body portion 13, in which the first body portion 11 is provided with a keyboard 111 and the second body portion 13 is provided with a display 131. In more detail, FIG. 1A illustrates a configuration where the portable electrical device 1 is closed. In this configuration, the portable electrical device 1 mainly exposes the display 131 at the front of the second body portion 13 and keys 15 located at the side to apply general operations such as simple instruction input, incoming call answering and so on. In reference to FIG. 1B, when the input of a relatively complex instruction with the keyboard is needed, the second body portion 13 can be slid with respect to the first body portion 11 to expose the keyboard 111.

Hence, when using the conventional portable electrical device, the user can only rely on himself or herself to adjust the portable electrical device to a particular angle with respect to the users' eyes for comfortable watching depending on different use conditions and environmental brightness. In other words, when the user operates the portable electrical device at different operational conditions (e.g., held in a hand or put on a desk), the optimal viewing angle of the portable electrical device varies. Hence, using the portable electrical device under different conditions by only adjusting the orientation in which it is held in the hand by the user would fail to satisfy the user's needs during an extended time of use, thereby causing inconvenience.

In view of this, this invention provides a multi-staged hinge assembly for a portable electrical device, which allows the user to use different tilt angles depending on different use conditions.

SUMMARY OF THE INVENTION

One objective of this invention is to provide a multi-staged hinge assembly and a portable electrical device. Because the multi-staged hinge assembly of this invention uses a non-circular spindle in conjunction with movable components that have different axial holes and movement between the movable components is actuated by cam structures, sleeves that are needed in conventional hinge assemblies are eliminated straightforwardly, which results in a simpler construction, smaller overall volume, higher assembling efficiency and consequently lower costs. Therefore, the multi-staged hinge assembly of this invention is especially suitable for portable electrical devices of the slide type.

Another objective of this invention is to provide a multi-staged hinge assembly and a portable electrical device. With the cam structures, the elastic components can provide a pre-compressed elastic energy to tilt the particular structures of the portable electrical device to an angle automatically after the sliding movement. Then, the user may make further adjustments to the angle as desired so that the portable electrical device using the multi-staged hinge assembly of this invention can present different tilt angles for watching to satisfy the diversified needs.

This invention provides a multi-staged hinge assembly, which comprises a spindle, an elastic device, a first movable component and a second movable component. The elastic device, the first movable component and the second movable component are sequentially disposed onto the spindle, with each of the first movable component and the second movable component with a respective cam structure. The first movable component is adapted to travel in a non-rotating displacement towards a direction away from the first portion along the spindle when being subjected to an axial thrust from the elastic device, whereas the second movable component is adapted to travel in a non-displacing rotation in response to an action resulting from the cam structures.

Additionally, this invention further provides a portable electrical device, which comprises a first body portion, a second body portion, a sliding module and the aforesaid multi-staged hinge assembly. Each of the sliding module and the multi-staged hinge assembly is connected to the first body portion and the second body portion so that by combining the slide module and the multi-staged hinge assembly, the second body portion is capable of sliding and then rotating with respect to the first body portion. In this way, the two body portions of the portable electrical device rotate with respect to each other in response to the action resulting from the multi-staged hinge assembly. Moreover, the two body portions may further form different angles therebetween to facilitate the user's operation. With the technology disclosed by this invention, the second body portion can slide and then be tilted automatically at a predetermined angle with respect to the first body portion, and the second body portion can be adjusted to any tilt angle within a specific range depending on the user's preferences and environmental conditions to provide a multi-staged hinge assembly of a free stop design. Alternatively, the partial structures of the multi-staged hinge assembly may be modified so that after the second body portion is automatically tilted at the predetermined angle, the user may further apply a force to rotate the second body portion automatically to another predetermined angle make the so-called click-point adjustment. Of course, the multi-staged hinge assembly of this invention may be designed with a plurality of click points to satisfy the different needs of users and deliver the optimal effect.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2:
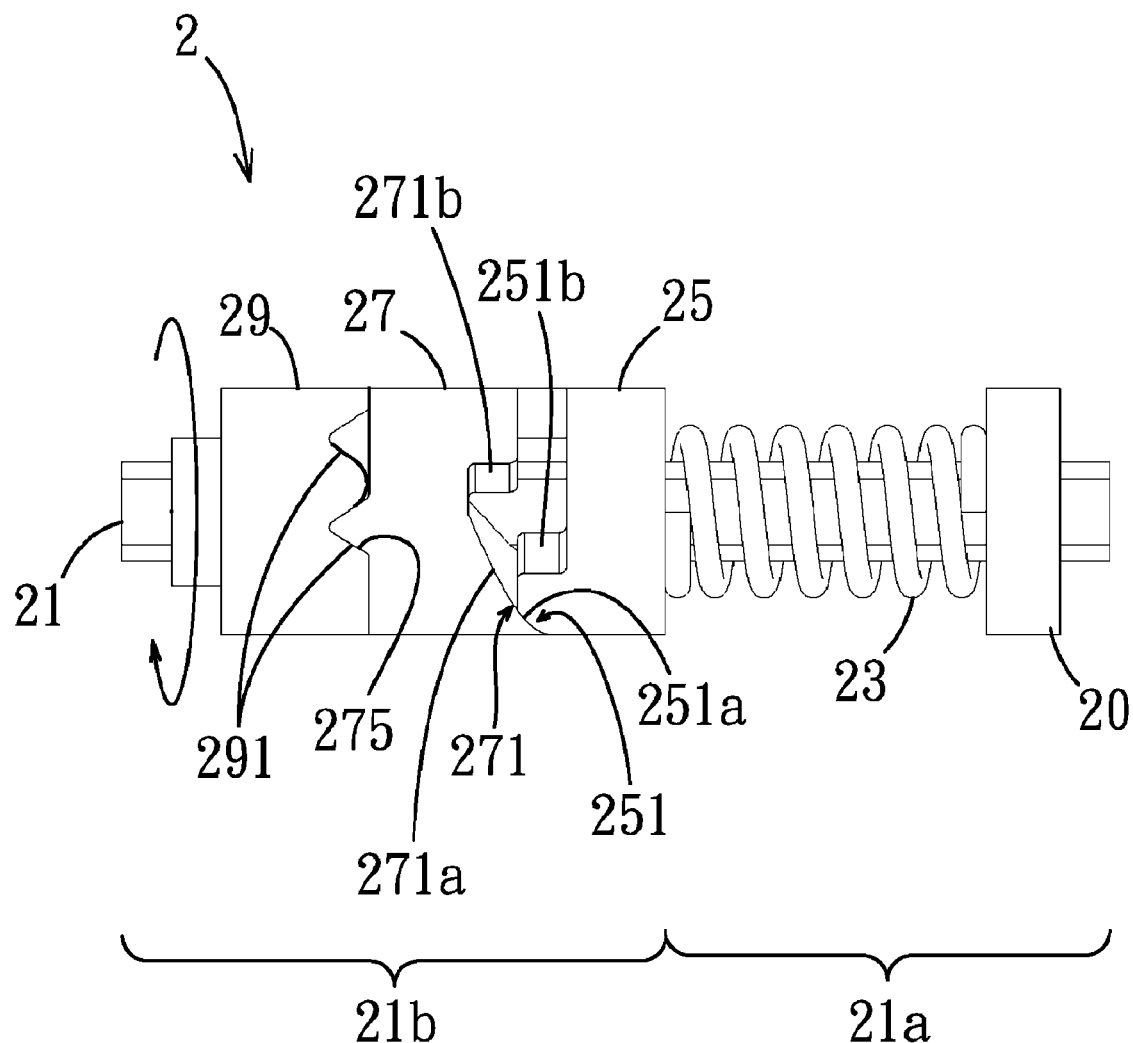
FIG. 2 is a schematic view of a multi-staged hinge assembly of this invention.

FIG. 2 depicts the first embodiment of this invention, which is a multi-staged hinge assembly 2. The multi-staged hinge assembly 2 comprises a stopper 20, a spindle 21, an elastic device 23, a first movable component 25 and a second movable component 27. The spindle 21 is in the form of a long rod, and for purposes of disclosure and description, the spindle 21 may be defined to comprise a first portion 21a and a second portion 21b. The stopper 20 is fixed on the first portion 21a of the spindle 21 opposite the first movable component 25, and the elastic device 23 is disposed onto the first portion 21a between the stopper 20 and the first movable component 25. The elastic device 23 has two opposite ends abutted against the stopper 20 and the first movable component 25 respectively.

In this embodiment, the elastic device 23 includes a spring, preferably a pre-compressed spring (i.e., pre-stored with elastic energy), that is disposed onto the first portion 21a of the spindle 21. Conceivably, the maximum distance between the stopper 20 and the first movable component 25 must not exceed the free length of the spring (i.e., a length of the spring when no compressive force is applied thereon). Thus, the spring is initially held in a pre-compressed state so that when the elastic force thereof is released, an axial thrust is applied along the spindle 21. Furthermore, because one end of the spring abuts against the stopper 20 that is fixed, the axial thrust will be released from the first portion 21a towards the second portion 21b so that the first movable component 25 tends to be forcedly moved towards a direction away from the first portion 21a. However, instead of being limited to a spring, the elastic device 23 may also be made of other elastic elements in other embodiments, and may be readily substituted by those of ordinary skill in the art.

To achieve the tendency of the aforesaid movement in this embodiment, the spindle 21 is designed with a non-circular cross-section, and the first movable component 25 is formed with a first axial hole (not shown) with a non-circular cross-section complementary to that of the spindle 21. With the first axial hole, the first movable component 25 can be movably disposed onto the spindle 21. Conceivably, as the spindle 21 and the first movable component 25 are fitted together by the non-circular cross-sections, movement of the first movable component 25 on the spindle 21 is restricted. In other words, the first movable component 25 is restricted from rotating over the spindle 21 but is only allowed to displace axially on the spindle 21, i.e., to move in a non-rotating displacement.

Next, the relationships between the first movable component 25 and the second movable component 27 will be further described. Both the first movable component 25 and the second movable component 27 are substantially disposed onto the second portion 21b of the spindle 21. Unlike the first movable component 25 comprising a non-circular first axial hole, the second movable component 27 comprises a second axial hole (not shown) which has a substantially circular cross-section for the spindle 21 to penetrate therethrough. With the fitment of the non-circular cross-section of the spindle 21 and the second axial hole with circular cross-section of the second movable component 27, the second movable component 27 can move in a non-displacing rotation over the spindle 21.

To drive the second movable component 27 to rotate by the first movable component 25, the first movable component 25 and the second movable component 27 are designed to have a first cam structure 251 and a second cam structure 271 respectively. The first cam structure 251 is formed on the first movable component 25 at an end opposite the elastic device 23, and the second cam structure 271 is formed on the second movable component 27 at an end abutting against the first cam structure 251. Specifically, each of the cam structures are substantially formed with a inclined surface; i.e., the first cam structure 251 of the first movable component 25 comprises a first inclined surface 251a, and the second cam structure 271 of the second movable component 27 comprises a second inclined surface 271a. The first inclined surface 251a is operatively associated with the second inclined surface 271a in such a way that the second inclined surface 271a can slide relative to the first inclined surface 251a. The first inclined surface 251a further comprises a first engagement end 251b, and the second inclined surface 271a further comprises a second engagement end 271b. The second engagement end 271b is operatively associated with the first engagement end 251a in such a way that when the second inclined surface 271a slides to a predetermined extent with respect to the first inclined surface 251a, the second engagement end 271b will be stopped by abutting against the first engagement end 251b.

Figure 3:
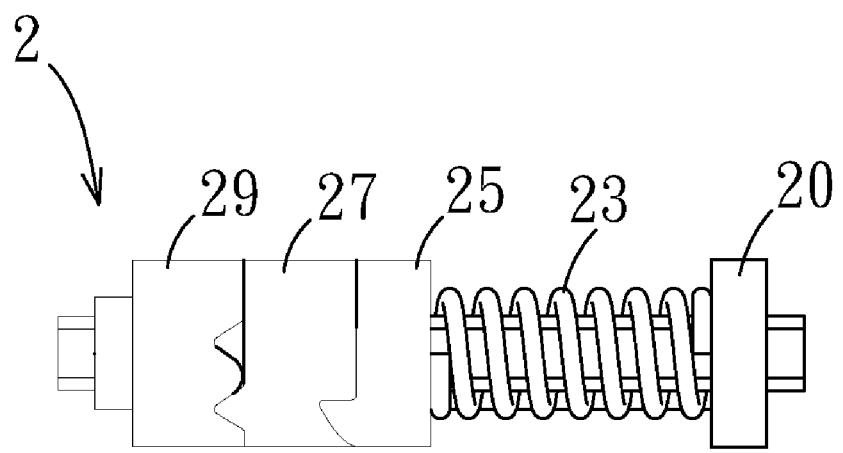
FIG. 3 is a schematic view of the multi-staged hinge assembly of this invention in another configuration.

In reference to both FIGS. 2 and 3, when the elastic device 23 applies the axial thrust toward the second portion 21b along the spindle 21 so that the first movable component 25 is forced to move in a non-rotating displacement away from the first portion 21a (i.e., towards the second portion 21b), the first movable component 25 which can only move in a non-rotating displacement on the spindle 21 will drive the second movable component 27 to travel in a non-displacing rotation on the spindle 21 because through the interaction of the first cam structure 251 and the second cam structure 271, the second inclined surface 271a of the second movable component 27 is adapted to slide relative to the first inclined surface 251a of the first movable component 25. Consequently, the second cam structure 271 is rotated from a first position shown in FIG. 2 to a second position shown in FIG. 3.

Figure 4:
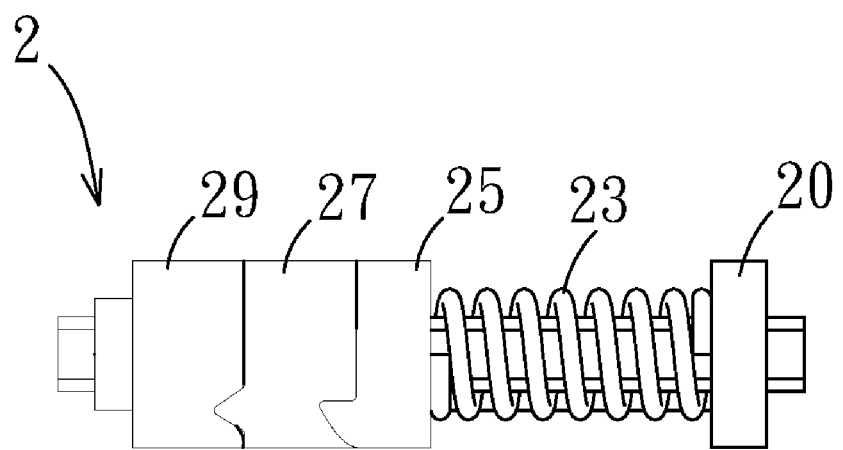
FIG. 4 is a schematic view of the multi-staged hinge assembly of this invention in a further configuration.
Figure 5A:
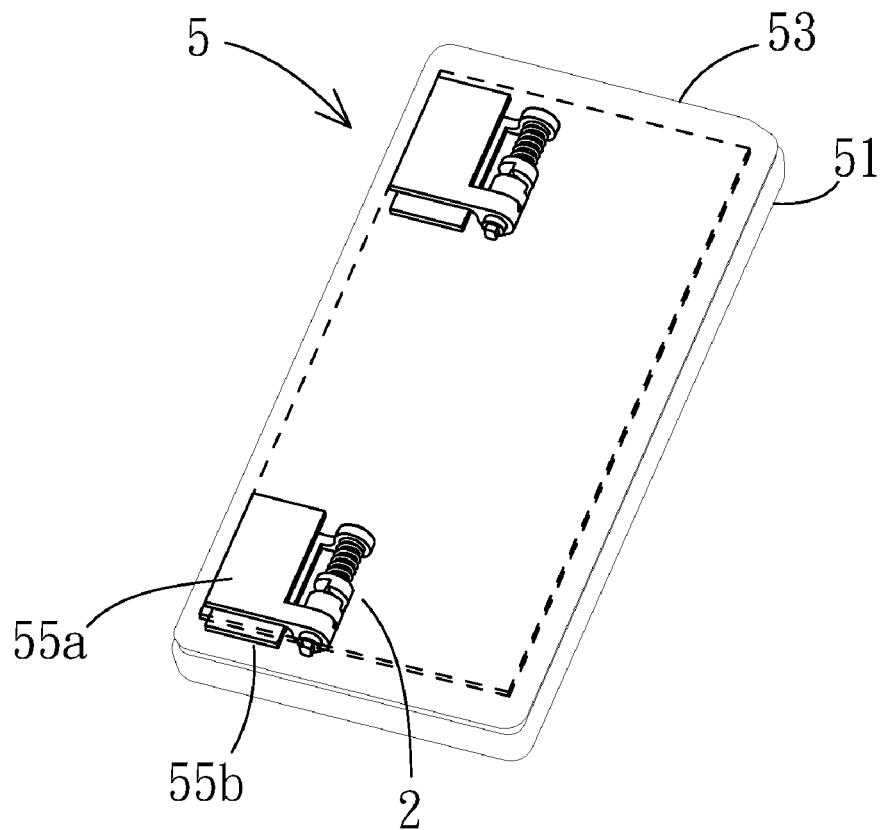
FIGS. 5A and 5B are schematic views of a portable electrical device incorporating the multi-staged hinge assembly of this invention in a closed configuration.
Figure 5B:
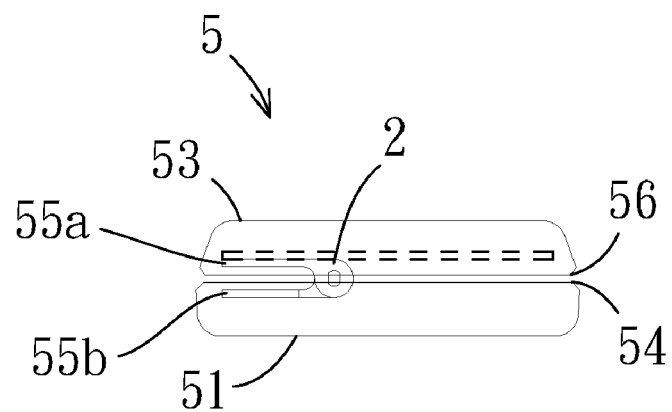

In reference to FIGS. 2, 3, and 4, the multi-staged hinge assembly 2 may further comprise a third movable component 29 with a third axial hole (not shown) for the spindle 21 to penetrate therethrough. Similar to the second axial hole of the second movable component 27, the third axial hole of the third movable component 29 also has a substantially circular cross-section. Thus, the third movable component 29 is disposed onto the second portion 21b of the spindle 21 and rotatably engages with the second movable component 27 at one end opposite the first movable component 25 (i.e., the second movable component 27 is disposed between the first movable component 25 and the third movable component 29). When the second movable component 27 rotates from the first position shown in FIG. 2 to the second position shown in FIG. 3, the third movable component 29 also rotates synchronously with the second movable component 27.

As shown, the second movable component 27 and the third movable component 29 further comprise a male structure 275 and a female structure 291 respectively for operatively associating with each other so that the third movable component 29 is adapted to engage with the second movable component 27. In some cases, the third movable component 29 may also move in a non-displacing rotation relative to the second movable component 27 similarly. For example, the male structure 275 is formed on the second movable component 27 at an end engaged with the third movable component 29, and the female structure 291 is formed on the third movable component 29 at an end engaged with the second movable component 27. In reference to both FIGS. 3 and 4, the male structure 275 is a protrusion, while the female structure 291 comprises at least two recesses. The protrusion is adapted to engage with each of the recesses respectively. When the second movable component 27 and the third movable component 29 are at the second position as shown in FIG. 3, a further external force applied to the third movable component 29 will drive the third movable component 29 to rotate with respect to the second movable component 27 to have the male structure 275 engage with another female structure 291 instead. As a result, the third movable component 29 is rotated from the second position shown in FIG. 3 to the third position shown in FIG. 4 with respect to the second movable component 27. It should be noted that what is illustrated above is only for purposes of description rather than limitation. In other embodiments, the male structure 275 and the female structure 291 may further be other complementary structures. Moreover, there may be more male structures 275 and female structures 291 so that the third movable component 29 can be rotated to more than two positions with respect to the second movable component 27.

With the design of this embodiment, when the first movable component 25 travels in the non-rotating displacement, the second movable component 27 and the third movable component 29 will travel together in the non-displacing rotation accordingly and the third movable component 29 may further rotate with respect to the second movable component 27.

It should be noted that, the multi-staged hinge assembly 2 disclosed in this embodiment uses the non-circular spindle 21 in conjunction with the different movable components 25, 27, 29 to bring about necessary relative movement. Through the different designs of the cross-sections of the axial holes, the inclined surfaces or the cam structures, different directions and angles of rotation may be obtained. Furthermore, in this embodiment, the spindle 21 is fixed while the second movable component 27 and the third movable component 29 can rotate with respect to the spindle 21; however, as can be known from the principle of relative movement, arrangements where the third movable component 29 is fixed and the spindle 21 moves relative thereto may also be used in practice, which will be readily appreciated by those of ordinary skill in the art based on concepts of this invention.

Figure 1A:
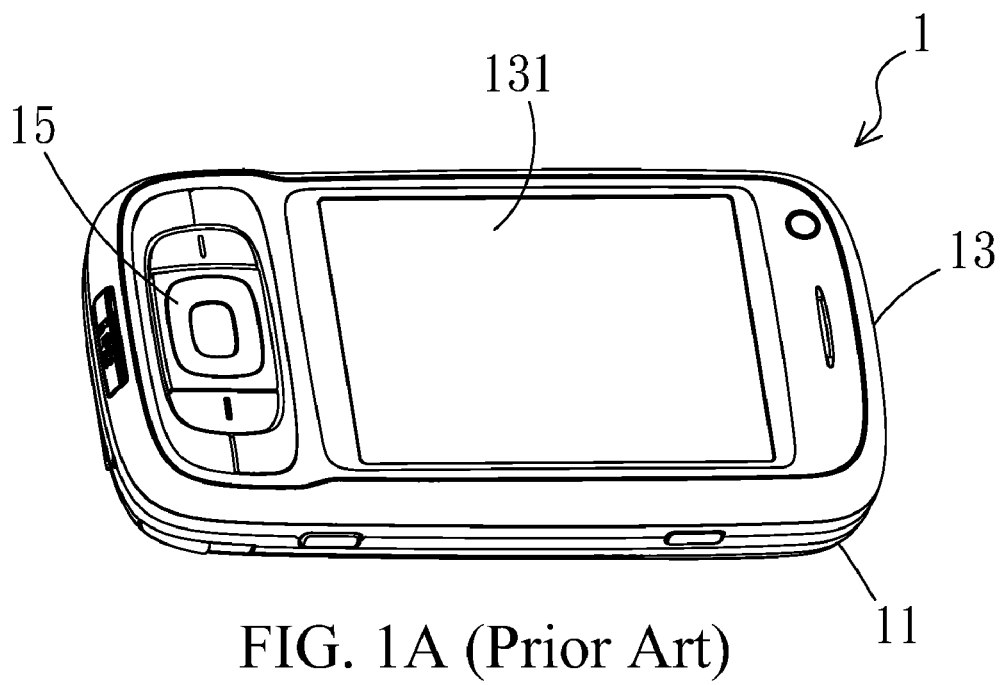
FIGS. 1A and 1B are schematic views illustrating the operation of a conventional portable electrical device of a slide type.
Figure 1B:
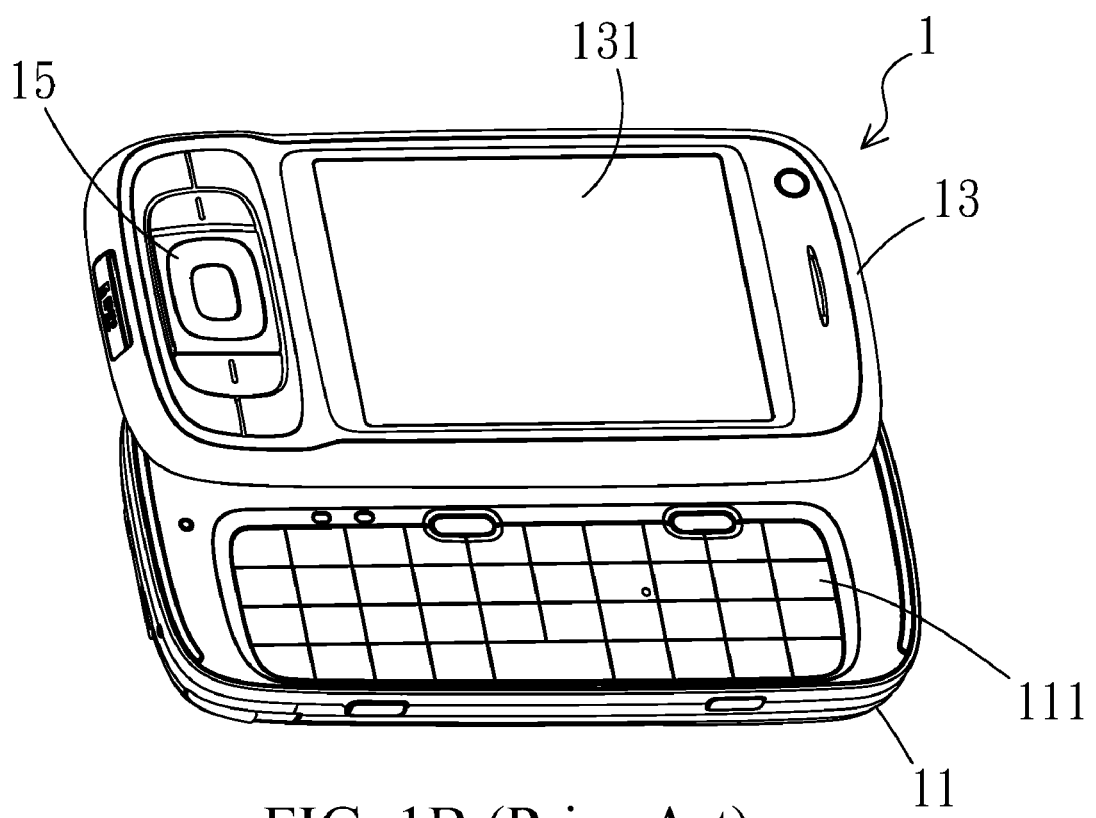

FIGS. 5A to 8B depict another embodiment of this invention, which is a portable electrical device 5 comprising the aforesaid multi-staged hinge assembly 2. The portable electrical device 5 mainly comprises a first body portion 51, a second body portion 53, a sliding module (not shown) and the multi-staged hinge assembly 2 disclosed in the aforesaid embodiment. Both the sliding module and the multi-staged hinge assembly 2 are connected to the first body portion 51 and the second body portion 53 respectively. In this embodiment, the portable electrical device 5 is provided with two multi-staged hinge assemblies 2, the detailed structure and operations of which are just as set forth in the above embodiment and will not be described again herein. Additionally, as the conventional portable electrical device 1 shown in FIGS. 1A and 1B, the first body portion 51 of this embodiment may further comprise a keyboard (not shown) and the second body portion 53 may further comprise a display (not shown). However, the main difference lies in that with the multi-staged hinge assembly 2, the first body portion 51 and the second body portion 53 of this embodiment are able to rotate relative to each other, which would be unable for the conventional portable electrical device 1.

In more detail, the second body portion 53 of the portable electrical device 5 is connected to the third movable component 29 of the multi-staged hinge assemblies 2 by means of a connecting member 55a. The stopper 20 is fixedly and integrally connected to the spindle 21 to form a single piece. The first body portion 51 is connected to the stopper 20 of the multi-staged hinge assemblies 2 by means of another connecting member 55b. In reference to FIGS. 5A and 5B, only one of the multi-staged hinge assemblies 2 will be described below. In the initial closed configuration of the portable electrical device 5, the first body portion 51 and the second body portion 53 abut against each other, i.e., a lower edge 56 of the second body portion 53 abuts against an upper edge 54 of the first body portion 51. Therefore, in this configuration, the multi-staged hinge assemblies 2 are restricted from any movement, with the elastic device 23 being kept at a pre-compressed state (e.g., a spring in a pre-compressed state).

Figure 6A:
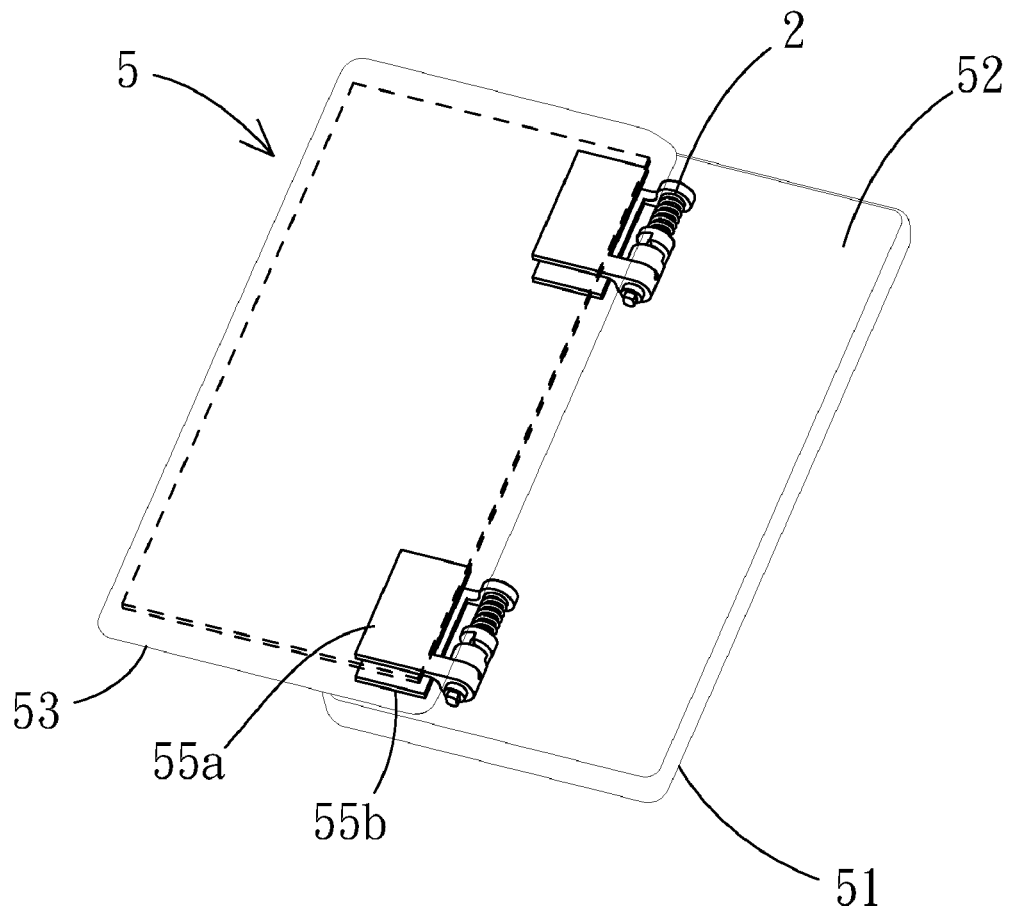
FIGS. 6A and 6B are schematic views of the portable electrical device of this invention in an open configuration after sliding.
Figure 6B:
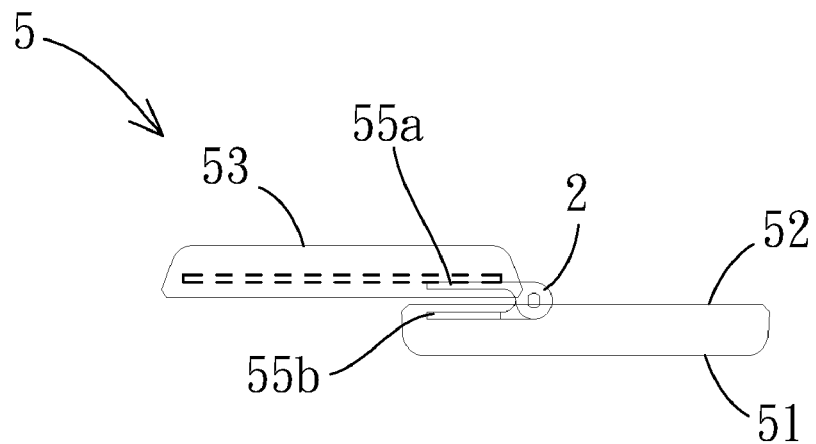

Further, in reference to FIGS. 6A and 6B, when the keyboard needs to be operated or a wider display field is needed, the user may slide the second body portion 53 along the surface 52 of the first body portion 51 under the guide of the sliding module to expose the keyboard (usually arranged on the surface 52). Accordingly, the portable electrical device 5 turns from the closed configuration into an open configuration for the user to input instructions into the portable electrical device 5 through the keyboard.

Figure 7A:
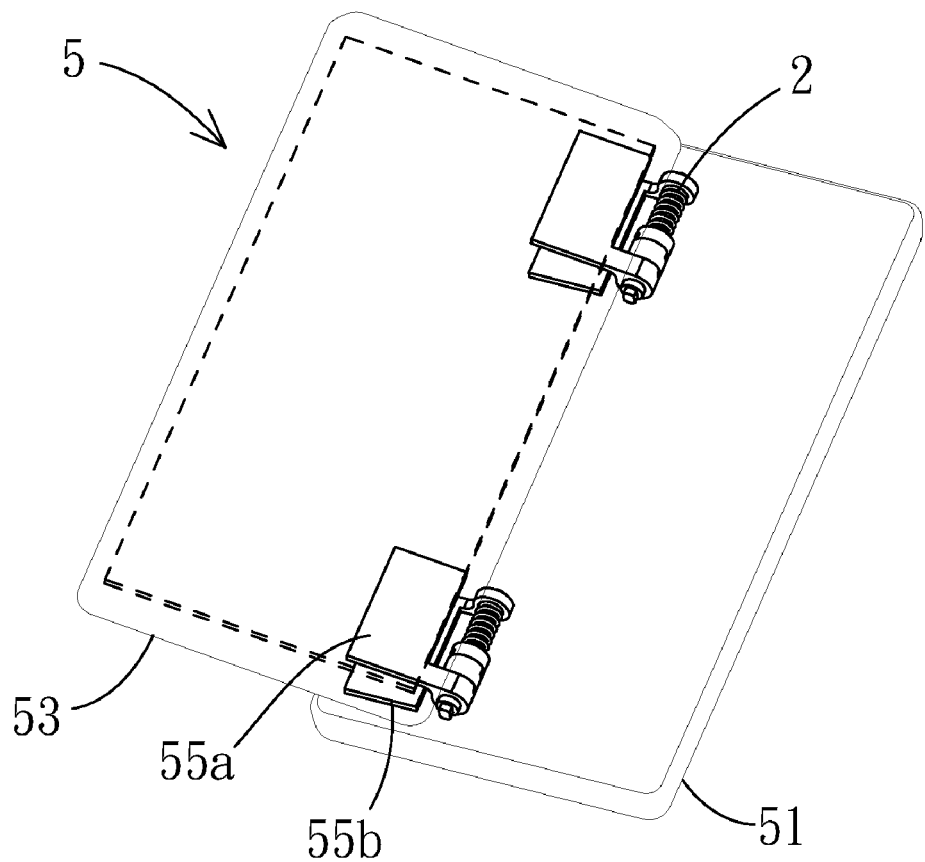
FIGS. 7A and 7B are schematic views of the portable electrical device of this invention in an automatic tilting configuration.
Figure 7B:
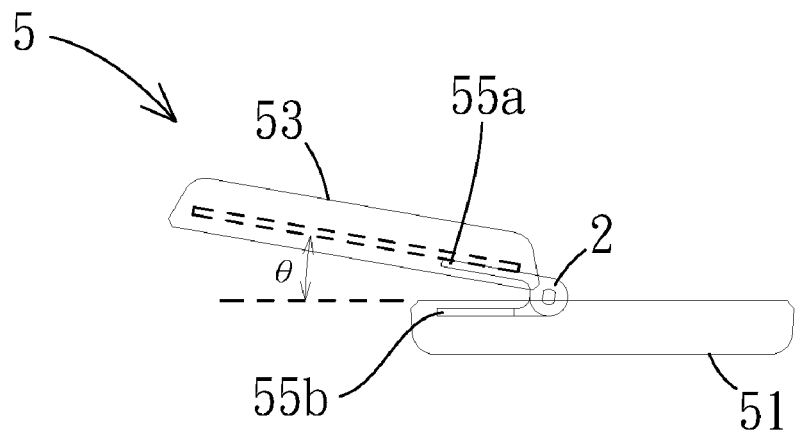

Once the second body portion 53 guided by the sliding module slides to the position shown in FIGS. 6A and 6B, the detent force generated when the lower edge 56 of the second body portion 53 abuts against the upper edge 54 of the first body portion 51 disappears and the multi-staged hinge assemblies 2 are no longer restricted from movement. Then, the elastic energy of the pre-compressed elastic device 23 is released to rotate the multi-staged hinge assemblies 2 from the first position shown in FIG. 2 to the second position shown in FIG. 3, in which case the portable electrical device 5 exhibits a relative positional relationship between the first body portion 51 and the second body portion 53 as shown in FIGS. 7A and 7B. In reference to both FIGS. 2 and 3, in this stage, due to the engagement of the male structure 275 of the second movable component 27 and the female structure 291 of the third movable component 29, the third movable component 29 rotates synchronously with the second movable component 27 without any relative rotation therebetween. Also, because the stopper 20 is connected integrally to the first body portion 51 by means of the connecting member 55b, the connecting member 55a and the third movable component 29 will automatically result with a corresponding rotation while the first body portion 51 and the connecting member 55b remains stationary. That is, the second body portion 53 will rotate automatically with respect to the first body portion 51 to provide an automatic tilting effect. The rotation that automatically tilts the second body portion 53 will stop until the first engagement end 251b and the second engagement end 271b of the multi-staged hinge assemblies 2 are engaged with each other (i.e., the second position shown in FIG. 3). At this point, the second body portion 53 forms a tilt angle θ with the first body portion 51. Substantially, the tilt angle θ may be about 0° to 20°, which is well suitable for general handheld use conditions.

Figure 8A:
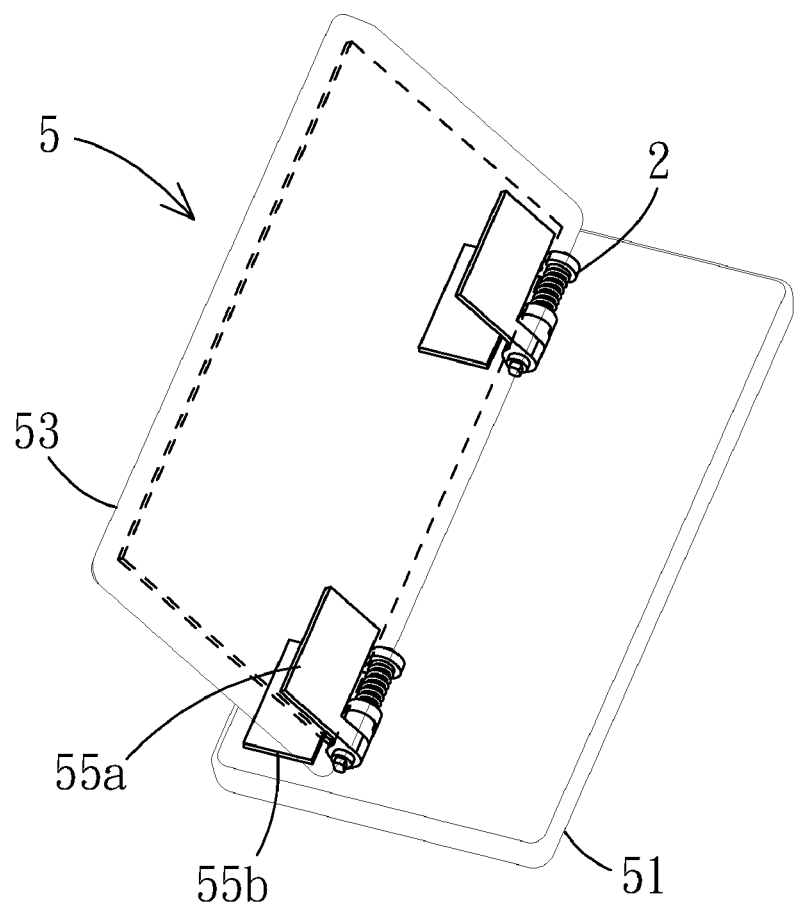
FIGS. 8A and 8B are schematic views of the portable electrical device of this invention in another operational configuration.
Figure 8B:
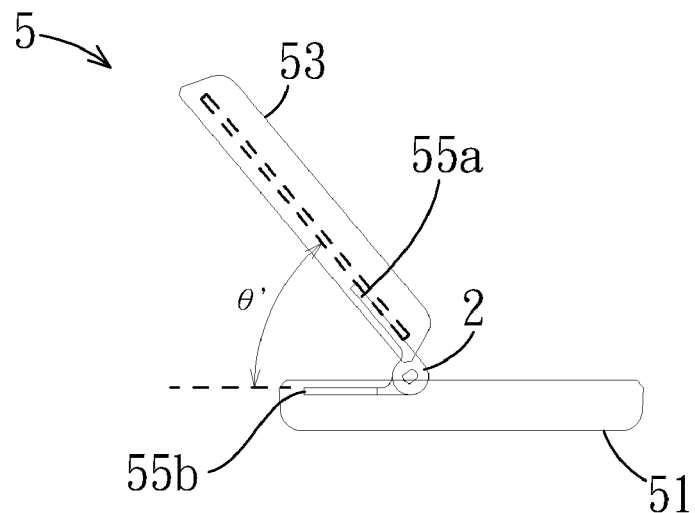

In reference to FIGS. 8A and 8B, the user may further adjust the tilt angle of the second body portion 53 with respect to the first body portion 51. Specifically, the user may apply a force to rotate the second body portion 53 to a larger tilt angle θ'. In practice, the tilt angle θ' may be about 20° to 50° and larger than the tilt angle θ, which is well suitable for use in conditions where the portable electrical device 5 is placed flat on a table.

During this stage, as shown in FIGS. 2, 3 and 4, the tilt angle is adjusted by changing the relative position between the female structures 291 of the third movable component 29 and the male structure 275 of the second movable component 27. When subjected to a force, the third movable component 29 will rotate with respect to the second movable component 27; i.e., the male structure 275 (i.e., the protrusion) of the second movable component 27 will slide from one recess to another of the female structure 291 and be engaged. Once the male structure 275 slides through the dome portion where the two female structures 291 join with each other, the protrusion can slide along the dome portion to rotate the third movable component 29 from the second position to the third position with the elastic energy released from the elastic device 23 and effect between the male structure 275 and the female structures 291 even if the user stops applying the force to the second body portion 53. Accordingly, the second body portion 53 of the portable electrical device 5 automatically rotates from the previous tilt angle θ to another predetermined angle θ' to accomplish the so-called click point adjustment. Of course, the multi-staged hinge assemblies 2 of this invention may also have a plurality of click points to satisfy the different needs of the users and deliver an optimal effect.

Figure 9A:
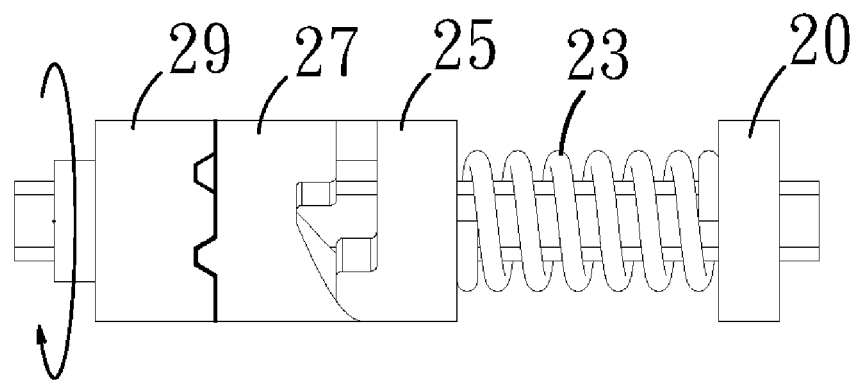
FIGS. 9A and 9B are schematic views of other embodiments of the multi-staged hinge assembly of this invention.

It should be noted that the dome portion where the two female structures 291 join with each other is only provided as an example but not for purposes of limitation. Rather, the male structure 275 and the female structures 291 may be designed differently depending on practical needs. For example, as shown in FIG. 9A, the male structure 275 and the female structures 291 are formed of a material with a large friction coefficient, and the protrusion of the male structure 275 and the recesses of the female structures 291 have modified tip ends so that they are flatter. In addition, the distance between the two female structures 291 of the third movable component 29 is extended to form a flat portion. In this case, during the rotation of the third movable component 29 from the aforesaid second position to the third position, if the user does not further apply a force, the male structure 275 may temporarily come to a stop on the flat portion of the third movable component 29, i.e., between these female structures 291, due to the static friction between the protrusion and the flat portion. This provides a free stop effect which lasts until the user has decided an optimal viewing angle.

Figure 9B:
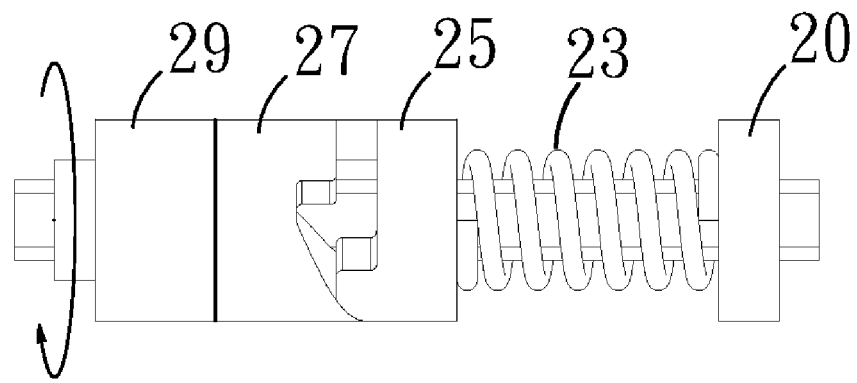

In another example as shown in FIG. 9B, if respective contact surfaces of the second movable component 27 and the third movable component 29 are formed of materials with a sufficiently large friction coefficient and the elastic device has a large elastic coefficient (i.e., with large elastic energy), the male structure 275 and the female structures 291 may even be eliminated and, instead, the static friction generated when the contact surfaces of the second movable component 27 and the third movable component 29 abut against each other may be used directly for position purposes. In this case, when the third movable component 29 rotates from the aforesaid second position to the third position, the third movable component 29 may temporarily come to a stop with respect to the surface of the second movable component 27 if the user does not further apply a force.

Furthermore, another way to increase the friction between the contact surfaces is to form the recesses of the female structures 291 and the protrusion of the male structure 275 as a plurality of complementary fine structures, e.g., a plurality of complementary fine grooves, which may also provide multiple options of relative angles between the second body portion 27 and the first body portion 25. In other words, those skilled in the art may provide the second body portion 53 with multiple tilt angles through different designs of the male structure 275 and the female structures 291.

According to the above description, the multi-staged hinge assembly of this invention and the portable electrical device comprising the multi-staged hinge assembly use a spindle with non-circular cross-section in conjunction with cam structures of a plurality of movable components, which results in a simpler construction, smaller volume, reduced assembling time and lower costs of the multi-staged hinge assembly. In a portable electrical device comprising the multi-staged hinge assembly, subsequent to the relative sliding movement, the body portion will firstly be tilted at a particular tilt angle automatically, and then the user may further adjust the body portion to any desired angle depending on different conditions. Therefore, it is surely convenient for use.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A multi-staged hinge assembly, comprising:
a spindle having a first portion and a second portion;
an elastic device being disposed onto the first portion and adapted to provide an axial thrust towards the second portion;
a first movable component being disposed onto the second portion and comprising a first cam structure formed on the first movable component at an end opposing to the elastic device;

a second movable component being disposed onto the second portion and comprising a second cam structure abutted against the first cam structure;

a third movable component disposed onto the second portion and connected with the second movable component at an end opposite to the first movable component;

wherein the first movable component is adapted to travel in a non-rotating displacement towards a direction away from the first portion when the first movable component is subjected to the axial thrust, whereas the second movable component and the third movable component are adapted to travel in a non-displacing rotation in response to an action resulting from the first cam structure and the third movable component is capable of further rotating with respect to the second movable component.

2. The multi-staged hinge assembly as claimed in claim 1, wherein the spindle has a non-circular cross-section.

3. The multi-staged hinge assembly as claimed in claim 2, wherein the first movable component comprises a first axial hole and the second movable component comprises a second axial hole for the spindle to penetrate therethrough, the first axial hole having a cross-section complementary to the non-circular cross-section of the spindle and the second axial hole having a cross-section substantially being circular.

4. The multi-staged hinge assembly as claimed in claim 3, wherein the first cam structure of the first movable component comprises at least one first inclined surface and the second cam structure of the second movable component comprises at least one second inclined surface, wherein the first inclined surface operatively associates with the second inclined surface to drive the second movable component to travel in the non-displacing rotation from a first position to a second position when the first movable component travels in the non-rotating displacement.

5. The multi-staged hinge assembly as claimed in claim 4, wherein the first inclined surface comprises at least one first engagement end, the second inclined surface comprises at least one second engagement end corresponding to the first engagement end to constrain the second movable component at the second position.

6. The multi-staged hinge assembly as claimed in claim 5, wherein the third movable component comprises a third axial hole having a cross-section substantially being circular for the spindle to penetrate therethrough.

7. The multi-staged hinge assembly as claimed in claim 6, wherein the second movable component and the third movable component are respectively formed with at least one male structure and at least one female structure for operatively associating with each other.

8. The multi-staged hinge assembly as claimed in claim 7, wherein the male structure is a protrusion and the female structure comprises at least two recesses which are continuously disposed, the protrusion being adapted to couple to one of the recesses respectively for the third movable component to rotate with respect to the second movable component.

9. The multi-staged hinge assembly as claimed in claim 8, wherein the third movable component further comprises a dome portion disposed between the recesses for the protrusion to slide thereon.

10. The multi-staged hinge assembly as claimed in claim 8, wherein the third movable component further comprises a flat portion disposed between the recesses for the protrusion to be positioned thereon by virtue of a static friction therebetween.

11. The multi-staged hinge structure as claimed in claim 6, wherein each of the second movable component and the third movable component is formed with a contact surface to provide a static friction therebetween.

12. The multi-staged hinge structure as claimed in claim 5, further comprising a stopper which is disposed onto the first portion of the spindle and opposite to the first movable component, wherein the elastic device is a spring encircling onto the first portion of the spindle, the elastic device comprising two opposite ends abutting against the stopper and the first movable component respectively.

13. A portable electrical device, comprising:
a first body portion;
a second body portion;
a sliding module connecting to the first body portion and the second body portion, the first body portion having a surface, the second body portion being capable of sliding on the first body portion along the surface thereof; and
a multi-staged hinge assembly connecting to the first body portion and the second body portion so that the second body portion is capable of moving in the non-displacing rotation after sliding with respect to the first body portion, the multi-staged hinge assembly comprising:
a spindle having a first portion and a second portion;
an elastic device being disposed onto the first portion and adapted to provide an axial thrust towards the second portion;
a first movable component being disposed onto the second portion and comprising a first cam structure formed on the first movable component at an end opposing to the elastic device;
a second movable component being disposed onto the second portion and comprising a second cam structure abutted against the first cam structure;
wherein the first movable component is adapted to travel in a non-rotating displacement towards a direction away from the first portion when the first movable component is subjected to the axial thrust, whereas the second movable component is adapted to travel in a non-displacing rotation in response to an action resulting from the first cam structure.

14. The portable electrical device as claimed in claim 13, wherein the spindle has a non-circular cross-section.

15. The portable electrical device as claimed in claim 14, wherein the first movable component comprises a first axial hole and the second movable component comprises a second axial hole for the spindle to penetrate therethrough, the first axial hole having a cross-section complementary to the non-circular cross-section of the spindle and the second axial hole having a cross-section substantially being circular.

16. The portable electrical device as claimed in claim 15, wherein the first movable component comprises at least one first inclined surface the second movable component comprises at least one second inclined surface, wherein the first inclined surface operatively associates with the second inclined surface to drive the second movable component to travel in the non-displacing rotation from a first position to a second position when the first movable component travels in the non-rotating displacement.

17. The portable electrical device as claimed in claim 16, wherein the first inclined surface comprises at least one first engagement end, the second inclined surface comprises at least one second engagement end corresponding to the first engagement end to constrain the second movable component at the second position.

18. The portable electrical device as claimed in claim 17, wherein the multi-staged hinge assembly further comprises a third movable component disposed onto the second portion and connected with the second movable component at an end opposite to the first movable component such that the third movable component is capable of traveling in the non-displacing rotation along with the second movable component, the third movable component comprising a third axial hole having a cross-section substantially being circular for the spindle to penetrate therethrough.

19. The portable electrical device as claimed in claim 18, wherein the second movable component and the third movable component are respectively formed with at least one male structure and at least one female structure for operatively associating with each other.

20. The portable electrical device as claimed in claim 19, wherein the male structure is a protrusion and the female structure comprises at least two recesses which are continuously disposed, the protrusion being adapted to couple to one of the recesses respectively for the third movable component to rotate with respect to the second movable component.

21. The portable electrical device as claimed in claim 20, wherein the second body portion connects to the third movable component so that the second body portion rotates along with the non-displacing rotation of the third movable component after the second body portion slides with respect to the first body portion.

22. The portable electrical device as claimed in claim 20, wherein the third movable component further comprises a dome portion disposed between the recesses for the protrusion sliding thereon.

23. The portable electrical device as claimed in claim 20, wherein the third movable component further comprises a flat portion disposed between the recesses for the protrusion positioned thereon by virtue of a static friction therebetween.

24. The portable electrical device as claimed in claim 20, wherein each of the second movable component and the third movable component is formed with a contact surface to provide a static friction therebetween.

25. The portable electrical device as claimed in claim 17, further comprising a stopper which is disposed onto the first portion of the spindle and opposite to the first movable component, wherein the elastic device is a spring encircling onto the first portion of the spindle, the elastic device comprising two opposite ends abutting against the stopper and the first movable component respectively.

26. The portable electrical device as claimed in claim 13, wherein the first body portion further comprises a keyboard assembly disposed on the surface thereof and the second body portion further comprises a display.

* * * * *